Figure 1:
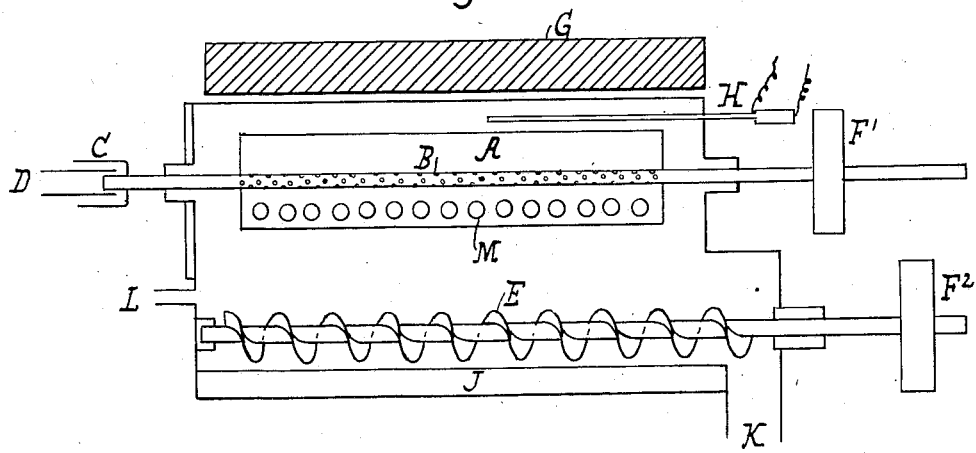

Oct. 18, 1932.    W. HAAG    1,882,813
CATALYSTS FOR THE PRODUCTION OF CARBON BLACK

Filed May 31, 1930

INVENTOR
Walther Haag
BY
ATTORNEYS

Patented Oct. 18, 1932

1,882,813

UNITED STATES PATENT OFFICE

WALTHER HAAG, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

CATALYSTS FOR THE PRODUCTION OF CARBON BLACK

Application filed May 31, 1930, Serial No. 457,889, and in Germany June 3, 1929.

This invention relates to improvements in catalysts and in apparatus for the manufacture and production of carbon black.

In the manufacture and production of carbon black as hitherto practiced by decomposition of gaseous combustible carbon compounds such as carbon monoxide, hydrocarbons or mixtures of these substances at elevated temperatures in the presence of catalysts there is the frequent drawback that the activity of the catalysts hitherto employed rapidly subsides.

I have now found that the said process may be carried out in an advantageous manner without the last mentioned drawback by employing catalysts which contain metals, in particular those of the iron group by which is understood iron, nickel and cobalt, which have been obtained by decomposition of carbonyl compounds in such a manner that the metal is obtained in a finely divided state. The said decomposition is usually effected by a decomposition by heat of the carbonyl in a gaseous space at a distance from solid surfaces, as described in the Patents No. 1,759,659 and No. 1,759,661. Another known method of decomposing carbonyls to form the corresponding metals in a finely divided state consists in passing the vapors of carbonyls in a diluted state over heated small metal bodies as referred to in the Patent No. 1,759,658.

The catalysts may be prepared, for example, by making the said finely divided metals, after the addition of other substances having catalytic or activating properties, into a paste, introducing them into suitable moulds, if necessary pressing them and then subjecting them to a gentle sintering in a reducing atmosphere. As examples of the said other substances which may be incorporated in the catalyst may be mentioned compounds, for example oxides, hydroxides or carbonates or compounds furnishing these of alkaline earth metals or of alkali metals, compounds of aluminium or of zinc and also compounds of metals of the iron group, such as nickel nitrate or iron hydroxide. They may also be prepared by sintering the masses without additional substances and subsequently providing them with additional substances as for example by impregnating them with solutions of alkali metal or alkaline earth metal compounds. The said additions are usually made in amounts varying between 0.2 and 20 per cent.

The catalysts prepared in this manner are characterized not only by very good mechanical properties but also by high efficiency and durability in use. They are especially suitable for the manufacture and production of carbon black which may be employed in an excellent manner as a filler in the vulcanization of rubber and of polymerization products of diolefines such as butadiene.

In the manufacture and production of carbon black by the decomposition of carbon compounds, as for example hydrocarbons or carbon monoxide, at elevated temperatures in the presence of catalysts, provision must be made for the continuous removal from the reaction chamber of the carbon black formed, since otherwise on the one hand continuous working is prevented owing to obstructions or clogging up and on the other hand the quality of the carbon black as regards its suitability for employment as a filler for rubber suffers by reason of its being in the reaction chamber for too long a period of time. It has already been proposed to blow the carbon black out from the reaction chamber by means of a stream of gas; generally speaking, however, the carbon adheres so firmly to the catalyst and the walls of the reaction chamber that this method is ineffective.

I have now found that these drawbacks are overcome and a carbon black having very good properties is obtained in accordance with the present invention by carrying out the decomposition of the carbon compounds in a rotating vessel, preferably provided with perforated walls for leading off the carbon black formed, in which the catalyst is present in a freely movable state.

The catalysts may be employed for example in a shape, at least one cross-section of which is circular for example in the form of cylinders, balls, ellipsoids or the like. Catalysts shaped as described readily enter into rolling motion in the rotating reaction vessel, which may be for example a drum rotating about its longitudinal axis, and thus by reason of the mutual rubbing of the pieces of the catalyst or the rubbing of the walls of the drum by the pieces of the catalyst, the adherent carbon black is detached. If holes or slots be provided in the walls of the drum, which are not sufficiently wide to allow of the passage of the catalyst, the said carbon black falls through the said holes or slots into a vessel provided beneath the drum, from which it may be removed periodically or continuously.

When employing long reaction vessels, such as long rotating drums, it is preferable to introduce the gases to be decomposed at both ends of the reaction vessel or through a tube arranged in the centre of the reaction vessel which is provided with openings in its walls throughout its whole length, in order that a uniform stream of gas may be produced in the interior of the reaction vessel. The gases may leave the drum through the holes or slots in the walls of the drum, which are provided for the removal of the carbon black.

The nature of the invention will be further described with reference to the accompanying drawing which shows diagrammatically an arrangement of apparatus in accordance with this invention, but the invention is not restricted to this arrangement.

Figure 2:
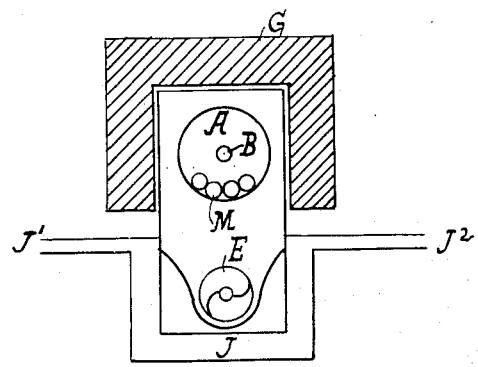

The arrangement is shown in longitudinal section in Figure 1 and in cross section in Figure 2. D is a stationary pipe arranged in a stuffing box C for the admission of the gas to be decomposed into the hollow axle B of a rotating drum A. The hollow axle B is provided with fine openings for the admission of gas into the interior of the rotating drum A in which a catalyst, shaped into balls M, is present. Holes or slots (not shown in the drawing) are provided in the walls of the drum A through which the carbon black formed falls into the lower part of the apparatus. A conveyor worm E is provided for the continuous removal of the carbon black through an opening K. The lower part of the apparatus is surrounded by a cooling jacket J, the cooling water being led thereto and withdrawn therefrom by means of the pipes $J_1$ and $J_2$. L is a pipe for the removal of the residual gases from the apparatus. G is the heating body, H a thermo element and $F_1$ and $F_2$ the driving wheels for the drum A and the conveyor worm E respectively.

The following examples will further illustrate the nature of this invention, but the invention, is not restricted to these examples. The parts are by weight.

Example 1

A mixture of 100 parts of nickel powder obtained by thermal decomposition of nickel carbonyl, 20 parts of a 50 per cent solution of potassium carbonate and water is brought into the form of cylinders 2 centimeters in length and 1 centimeter in diameter by pressing employing 10 atmospheres pressure. These cylinders are dried and heated for 1 hour at 800° centigrade in a stream of hydrogen, whereby the finely porous solid pieces sinter together without losing their external shape. Carbon monoxide may be decomposed to the extent of 92 per cent with the formation of a valuable carbon black and carbon dioxide by passing the gas over the catalyst once at a temperature of from 400° to 430° centigrade.

Example 2

500 parts of iron powder obtained by decomposition of iron carbonyl are worked up into a paste in a mixing machine with 300 parts of moist nickel hydroxide and water, and the paste obtained is moulded into balls having a diameter of from 1 to 2 centimeters. After drying, these are heated at 800° centigrade for 2 hours in a stream of hydrogen.

Referring to the drawing, 30 grams of the catalyst thus obtained are placed in the drum A. The said drum may have a diameter of about 8 centimeters and a length of about 30 centimeters. The drum is slowly rotated and about 42 liters of ethylene, introduced by way of the axle B, are passed through the drum per hour, an interior temperature of between about 400° and 430° centigrade being maintained. The gas is decomposed with the formation of large amounts of carbon black and the effluent gases contain only about 5 to 10 per cent of ethylene, which can be completely decomposed in a subsequent decomposition. The carbon black thus formed falls into the lower part of the apparatus cooled by the cooler J, and is passed by means of the conveyor E to the opening K where the carbon black is ejected.

Example 3

A horizontally arranged cylinder of 5 liters capacity which is rotating about its longitudinal axis is provided with 5 grams of cobalt powder obtained from cobalt carbonyl and is kept at a temperature of 450° centigrade. Before use the cobalt powder is moistened with a 2 per cent solution of potassium carbonate in order to increase the activity of the catalyst. 1500 liters of carbon monoxide are led through this apparatus in the course of 25 hours. 300 grams of carbon black are obtained from which the cobalt powder which is intermingled therewith may be removed by stirring with dilute nitric acid.

What I claim is:—

1. In the production of carbon black by thermal catalytic decomposition of gaseous combustible carbon compounds, the step of contacting said carbon compounds with a solid catalyst comprising a finely divided metal prepared by decomposition of a carbonyl compound and a compound of a metal selected from the alkali metals and the alkaline earth metals.

2. In the production of carbon black by thermal catalytic decomposition of gaseous combustible carbon compounds, the step of contacting said carbon compounds with a solid catalyst comprising a finely divided metal of the iron group, prepared by decomposition of a carbonyl compound, and an alkali metal compound.

3. In the production of carbon black by thermal catalytic decomposition of gaseous combustible carbon compounds, the step of contacting said carbon compounds with a solid catalyst comprising a finely divided metal of the iron group, prepared by decomposition of a carbonyl compound, and an alkali metal carbonate.

4. In the production of carbon black by thermal catalytic decomposition of gaseous combustible carbon compounds, the step of contacting said carbon compounds with a solid catalyst prepared by making a finely divided metal prepared by decomposition of a carbonyl compound and an activator comprising a compound of a metal selected from the alkali metals and the alkaline earth metals into a paste, introducing said paste into a suitable mould, and subjecting the moulded catalyst thus obtained to a gentle sintering in a reducing atmosphere.

5. In the production of carbon black by thermal catalytic decomposition of gaseous combustible carbon compounds, the step of contacting said carbon compounds with a solid catalyst comprising a finely divided metal of the iron group, prepared by decomposition of a carbonyl compound, and between 0.2 and 20 per cent of an activator comprising a compound of a metal selected from the alkali metals and the alkaline earth metals.

6. A process for the production of carbon black, which comprises contacting carbon monoxide at a temperature of between about 400° and 450° C. with a catalyst prepared by moistening cobalt powder, obtained by decomposition of cobalt carbonyl, with potassium carbonate solution.

In testimony whereof I have hereunto set my hand.

WALTHER HAAG.